United States Patent

Hager

[15] 3,692,290
[45] Sept. 19, 1972

[54] PLANT FOR CONTINUOUSLY REFINING PIG IRON

[72] Inventor: Alois Hager, Linz, Austria

[73] Assignee: Vereinigte Osterreich-ische Eisen- und Stahlwerke Aktiengesellschaft, Linz, Austria

[22] Filed: Feb. 17, 1971

[21] Appl. No.: 116,087

[30] Foreign Application Priority Data

Feb. 20, 1970 Austria ........................... 1556

[52] U.S. Cl. ........................... 266/13, 75/52, 75/60, 266/34 T
[51] Int. Cl. ........................................ C21c 7/00
[58] Field of Search ...... 425/7; 75/45, 51, 52, 59, 60; 266/34 R, 34 T, 39, 13

[56] References Cited

UNITED STATES PATENTS

| | | |
|---|---|---|
| 949,474 | 2/1910 | Hawkins et al. ............... 75/52 |
| 3,272,618 | 9/1966 | Miller ........................... 75/60 |
| 3,558,121 | 1/1971 | Lenne ....................... 266/34 V |
| 3,610,600 | 10/1971 | Schnake ................... 266/34 V |

Primary Examiner—Gerald A. Dost
Attorney—Brumbaugh, Graves, Donohue & Raymond

[57] ABSTRACT

The invention relates to a plant for continuously refining pig iron comprising a vessel for storing and keeping warm pig iron and a closed spray-refining vessel in which a gaseous refining agent is blown onto a falling pig iron stream and an about horizontal spraying cone is formed, in which the improvement resides in that the vessel for storing and keeping warm the pig iron is provided with at least one electromagnetic conveying groove starting from its floor and ascending slantingly, its upper end ending into a supply funnel of the spray refining vessel. With this arrangement the advantage is gained that a uniform amount of liquid pig iron may continuously be fed into a spray refining vessel so that the amounts of refining gas and additions need not be changed.

3 Claims, 2 Drawing Figures

INVENTOR
ALOIS HAGER

BY Brumbaugh, Graves, Donohue & Raymond his ATTORNEYS

PLANT FOR CONTINUOUSLY REFINING PIG IRON

The invention relates to a plant for continuously refining pig iron comprising a vessel for storing and keeping warm pig iron and a closed spray-refining vessel in which a gaseous refining agent is blown onto a falling pig iron stream and a substantially horizontal spraying cone is formed. The falling pig iron stream is sprayed by the refining gas, e.g., pure oxygen or oxygen-enriched compressed air, and distributed into a plurality of droplets. The refined pig iron, or the steel, respectively, is collected on the floor of the vessel under formation of a sump and continuously tapped. The steel may run off into ladles and may be cast e.g., in a continuous casting plant.

In spray refining, slag forming agents, e.g., lime, fluorspar, bauxite and the like and other additions, such as ore or lime stone, are added either through an input funnel for the supply of the pig iron to the refining vessel or through special openings in the cover of the refining vessel and get into the sphere of action of the blowing jet or of the spraying cone, respectively.

All solid additions and the refining gas must be added to the refining vessel in exactly the amount which corresponds to the amount of supplied pig iron. Therefore it is suitable to keep constant the pig iron amount which is supplied through the input funnel into the refining vessel per time unit. As soon as variations occur in the amount of pig iron supplied per time unit, the amounts of refining gas and slag formers supplied have to be adapted to the changed amount of pig iron; thus regulation problems occur which are difficult to be mastered and have remained unsolved so far; it has not been possible so far to conduct the spray refining process exact and to produce a refined product of the desired final analysis and temperature. So far, the pig iron was supplied into the refining vessel by use of stopper ladles. In doing so, the ladles were set upon electronic scales, and the stopper of the casting ladle was operated pneumatically, for example. The change of the weight indicator of the scales was used as a measure for adjusting the stopper regulating the amount of outflow of the pig iron. Since the amount of pig iron flowing out from the floor opening of the stopper ladle per time unit greatly decreases with sinking melt level in the ladle, the position of the stopper has to be changed continuously in order to keep constant the amount of pig iron supplied to the refining vessel per time unit. It is difficult to carry out an automatic regulation of the pig iron supply because owing to the necessary exchange of ladles the operation is interrupted. It is rather time consuming to adjust the desired operation conditions after each ladle exchange; considerable variations occur in the chemical composition and in the temperature of the refined product produced during this time period so that, so far, it has not been possible to cast steel produced according to the spray refining process to blocks suitable as pre-product for the rolling mill. The steel has to be further treated for correcting its analysis and tapping temperature. This rather bothersome working method is not only expensive but it is also the main reason that so far it has not been possible to realize an absolutely continuous spray refining operation.

The invention is aimed at avoiding these disadvantages and difficulties and at creating an appliance with the help of which a constant amount of liquid pig iron may continuously be supplied to a spray refining vessel so that the amounts of refining gas and additions which have to be supplied to the refining vessel need not be changed.

In a plant for continuously refining pig iron of the type defined in the introductory part, these aims of the invention are achieved in that the vessel for storing and keeping warm the pig iron is provided with at least one electromagnetic conveying groove starting from its floor and ascending slantingly and in that the upper end of this conveying groove ends into a supply funnel of the spray refining vessel.

Preferably the upper end of the conveying groove ends in the inner face of the supply funnel and terminates flush with this face.

The vessel for storing and keeping warm the pig iron may be provided with two electromagnetic conveying grooves, the grooves being connected with a spray refining vessel each.

In order that the invention may be more fully understood an embodiment thereof shall now be explained with reference to the accompanying drawing.

Figure 1:
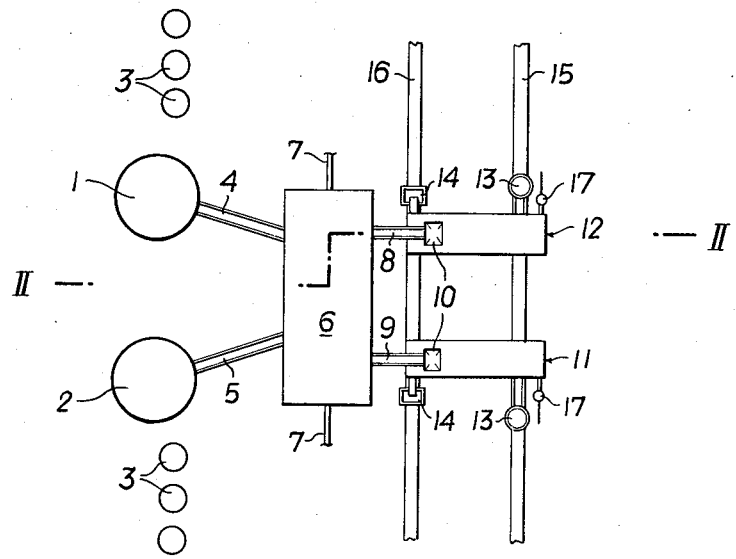
FIG. 1 is a top view of a plant in a schematical representation.

In FIG. 1 numerals 1 and 2 denote the two furnaces of a blast furnace plant and numeral 3 denotes their blast preheaters. The liquid pig iron may run through grooves 4, 5 into a storing vessel 6. The storing vessel 6 is situated on a lower level than the furnaces 1,2. By heating means 7 the pig iron contained in the storing vessel is kept warm. 8 and 9 are two electromagnetic conveying grooves for transporting the liquid pig iron from the storing vessel 6 into supply funnels 10 of spray refining vessels 11, 12. The conveying grooves are inductive conveying means with travelling electromagnetic fields. By means of a multi-phase winding 40 connected to a conventional multi-phase power source (not shown), a progressing magnetic field is built up, just as is the case with a normal induction motor; the iron melt follows this field in the direction of its progress. The conveyed throughput amount per time unit depends in a given arrangement only on the voltage applied at the winding or the inductor, respectively, and is not influenced by the changing bath level in the storing vessel. This great advantage of the electromagnetic conveying groove makes the dosing or control process independent from a precise measurement of the bath level in the storing vessel 6 or from a weight determination of the melt present in the storing vessel. The conveying amounts which are adjustable to be exactly reproduced are obtained exclusively by influencing electrical factors. The pig iron may be drawn from the storing vessel 6 without slag and conveyed slantingly in upward direction into the supply funnel 10. The refined pig iron or the steel, respectively, is continuously tapped into ladles 13 and the slag runs off at the same time into slag buckets 14. Numerals 15 and 16 denote rails on which railbound vehicles not shown in the drawing transport the casting ladles 13 and the slag buckets 14 to and fro. While the ladles are exchanged, the tap is closed for a short period by closing means 17 designed in a known manner; the closing means 17 is arranged to be rotatable.

Figure 2:
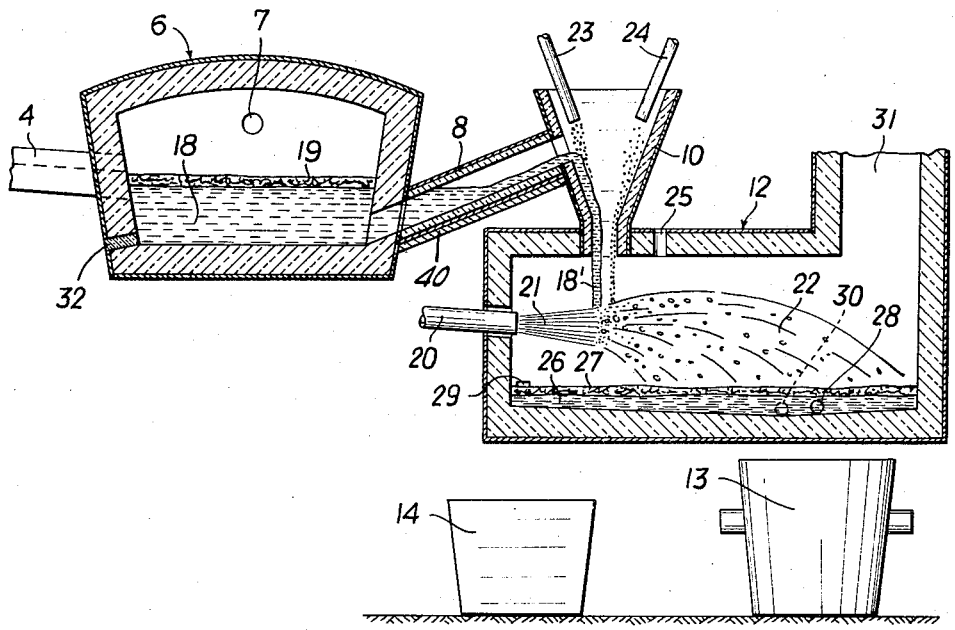
FIG. 2 is a sectional view along the line II—II of FIG. 1 on an enlarged scale.

FIG. 2 illustrates details of the arrangement of the conveying groove in relation to the spray refining plant. The storage vessel 6 collects the pig iron 18 running in via the groove 4, and the slag 19. The electromagnetic conveying groove 8, which is arranged to be slanting in upward direction, leads from the floor of the storing vessel to the inlet opening in the side wall of the supply funnel 10. When the end of the supply groove 8 terminates flush with the side wall of the funnel 10 a broad pig iron stream 18' runs through the bottom opening of the funnel 10. The longitudinal axis of the slit-shaped bottom opening is arranged vertically in relation to the longitudinal jet by means of which the pig iron stream 18' is atomized and refined under formation of a spraying cone 22. 23 and 24 are means for adding slag forming agents into the inlet funnel 10. Through a further opening 25 in the vault of the refining vessel 12 small pieces of scrap may be added as cooling agent. On the floor of the refining vessel 12 the steel 26 and the slag 27 are collected; they may continuously run off via tapping holes 28, 29. The steel tapping 28 leads from the floor of the refining vessel slantingly in upward direction so that a sump may be formed in the refining vessel 12 and the complete reaction of the slag with the metal is facilitated. Numeral 30 denotes a tapping hole for emptying the refining vessel; the hole remains closed while operation is in progress. Also the storage vessel 6 is provided with a tapping hole 32 for voiding which is likewise closed during operation.

The pig iron may also be conveyed to the storage vessel 6 by employing customary pig iron ladles. Obviously the storage vessel may be movable and may be designed in the manner of known torpedo-type mixers. Then, a transportation of liquid pig iron over wide distances is possible.

The uniform conveyance of the liquid pig iron from the storing vessel in connection with the formation of a broad pig iron stream falling into the refining vessel yields great operational advantages because the blowing jet may uniformly atomize the pig iron and the supplied amount of oxygen is optimally utilized.

What I claim is:

1. A plant for continuously refining pig iron comprising a vessel for storing and keeping warm pig iron, at least one closed spray-refining vessel in which a gaseous refining agent is blown onto a falling pig iron stream to atomize it under formation of a substantially horizontal spraying cone, and conveying means for transferring said pig iron between said vessels, said conveying means comprising at least one electromagnetic conveying groove having a lower end communicating with said vessel for storing and keeping warm pig iron at substantially floor level thereof, said groove ascending slantingly and ending with its upper end into a supply funnel of said spray refining vessel.

2. The plant set forth in claim 1, wherein the upper end of the conveying groove ends in an inner face of the supply funnel and terminates flush with this face.

3. The plant set forth in claim 1, wherein the vessel for storing and keeping warm pig iron is provided with two electromagnetic conveying grooves, each of the grooves being connected with a separate spray refining vessel.

* * * * *